US008581958B2

(12) United States Patent
Baker et al.

(10) Patent No.: US 8,581,958 B2
(45) Date of Patent: Nov. 12, 2013

(54) METHODS AND SYSTEMS FOR ESTABLISHING VIDEO CONFERENCES USING PORTABLE ELECTRONIC DEVICES

(75) Inventors: Mary G. Baker, Palo Alto, CA (US); Ian N. Robinson, Pebble Beach, CA (US); Ramin Samadani, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 290 days.

(21) Appl. No.: 13/089,112

(22) Filed: Apr. 18, 2011

(65) Prior Publication Data
US 2012/0262537 A1 Oct. 18, 2012

(51) Int. Cl.
*H04N 7/15* (2006.01)

(52) U.S. Cl.
CPC ..................................... *H04N 7/15* (2013.01)
USPC .................. 348/14.08; 348/14.09; 348/14.12

(58) Field of Classification Search
CPC .. H04N 7/152; H04N 21/00; H04N 2007/145
USPC ........................................... 348/14.01–14.16
See application file for complete search history.

(56) References Cited

U.S. PATENT DOCUMENTS

| | | | |
|---|---|---|---|
| 7,634,540 B2 | 12/2009 | Ivashin et al. | |
| 2005/0168402 A1 | 8/2005 | Culbertson et al. | |
| 2006/0098085 A1* | 5/2006 | Nichols et al. | 348/14.07 |
| 2008/0266384 A1* | 10/2008 | Triplicane et al. | 348/14.09 |
| 2009/0037826 A1 | 2/2009 | Bennetts | |
| 2009/0037827 A1 | 2/2009 | Bennetts | |
| 2009/0067350 A1 | 3/2009 | Stalnacke et al. | |
| 2009/0181659 A1 | 7/2009 | Stalnacke et al. | |
| 2011/0249074 A1* | 10/2011 | Cranfill et al. | 348/14.02 |
| 2012/0066596 A1* | 3/2012 | Feng et al. | 715/719 |
| 2012/0098921 A1* | 4/2012 | Stedman et al. | 348/14.08 |
| 2012/0194693 A1* | 8/2012 | Samadani et al. | 348/222.1 |

OTHER PUBLICATIONS

Kauff, Peter, et al., "Am Immersive 3D Video-Conferencing System Using Shared Virtual Team User Environments", CVE '02; Sep. 30-Oct. 2, 2002, Bonn, Germany.
Yamaguchi, Kota et al., "PTZ Control with Head Tracking tor Video Chat", CHI 2009—Spotlight on Works in Progress—Session 1; Apr. 4-9, 2009, Boston. MA; pp. 39193924.
Buthpitiya, Senaka, et al., "HyPhIVE: A Hybrid virtual-Physical Collaboration Environment", 2010 Third International Conference on Advances in Computer-Human Interactions, Feb. 10-16, 2010. Abstract Only.

* cited by examiner

*Primary Examiner* — Melur Ramakrishnaiah

(57) ABSTRACT

Methods and systems for using portable electronic devices in video conferences are disclosed. In one aspect, a method receives each remote participant's audio data stream and at least one video stream over a network and arranges the video streams in a data structure that describes the location of each video stream's associated viewing area within a virtual meeting space. The method blends audio streams into a combined audio of the remote participants. The method presents at least one viewing area on the portable device display to be viewed by the local participant, and changes the at least one viewing area to be presented on the portable device display based on cues provided by the operator.

20 Claims, 15 Drawing Sheets

METHODS AND SYSTEMS FOR ESTABLISHING VIDEO CONFERENCES USING PORTABLE ELECTRONIC DEVICES

TECHNICAL FIELD

This disclosure relates to video conferencing, and in particular, to video conferencing using portable electronic devices.

BACKGROUND

Video conferencing enables participants located at two or more sites to simultaneously interact via two-way video and audio transmissions. A video conference can be as simple as a conversation between two participants located at different sites or involve discussions between many participants each located at different sites and include any shared content such as a video presentation. As high-speed network connectivity has become more widely available at lower cost and the cost of video capture and display technologies continues to decrease, video conferencing conducted over networks between participants in faraway places has become increasing popular. Video conferencing has traditionally been conducted using separate components, such as video cameras and webcams to capture images of the participants; computer monitors, televisions, and projectors to display video images of the participants and any shared video content; microphones and speakers to capture and project voices; and computers to process and send the video and audio signals over a network.

In recent years, portable electronic devices such us smartphones and tablet computers have increased dramatically in popularity and utility. However, many portable electronic devices do not have large enough displays to simultaneously render a large number of remotely situated participants in a video conference with sufficient resolution. For instance, the traditional components used to conduct a video conference make it possible to conduct a video conference with each participant's display showing the other participants simultaneously. Each display may show a number of separate viewing areas. Each viewing area shows a video stream of one or more participants. With a large enough display, a participant can judge the mood and facial expressions of the other participants, making it possible for the participant viewing the display to relate to the other participants shown in the separate viewing areas. By contrast, using a portable electronic device in a traditional video conference with a large number of participants becomes problematic. In order to fit each viewing area within the display boundaries, the size of each viewing area is reduced and the display screen becomes crowded with viewing areas. If the number of viewing areas becomes large enough, the resolution of the display may not be adequate to judge the mood and facial expressions of the other participants, and even if the resolution is high enough, it becomes increasingly difficult for the participant using the portable device to relate to the other participants as their images get smaller. As a result, the use of portable devices in video conferences is typically avoided.

DETAILED DESCRIPTION

Figure 1:
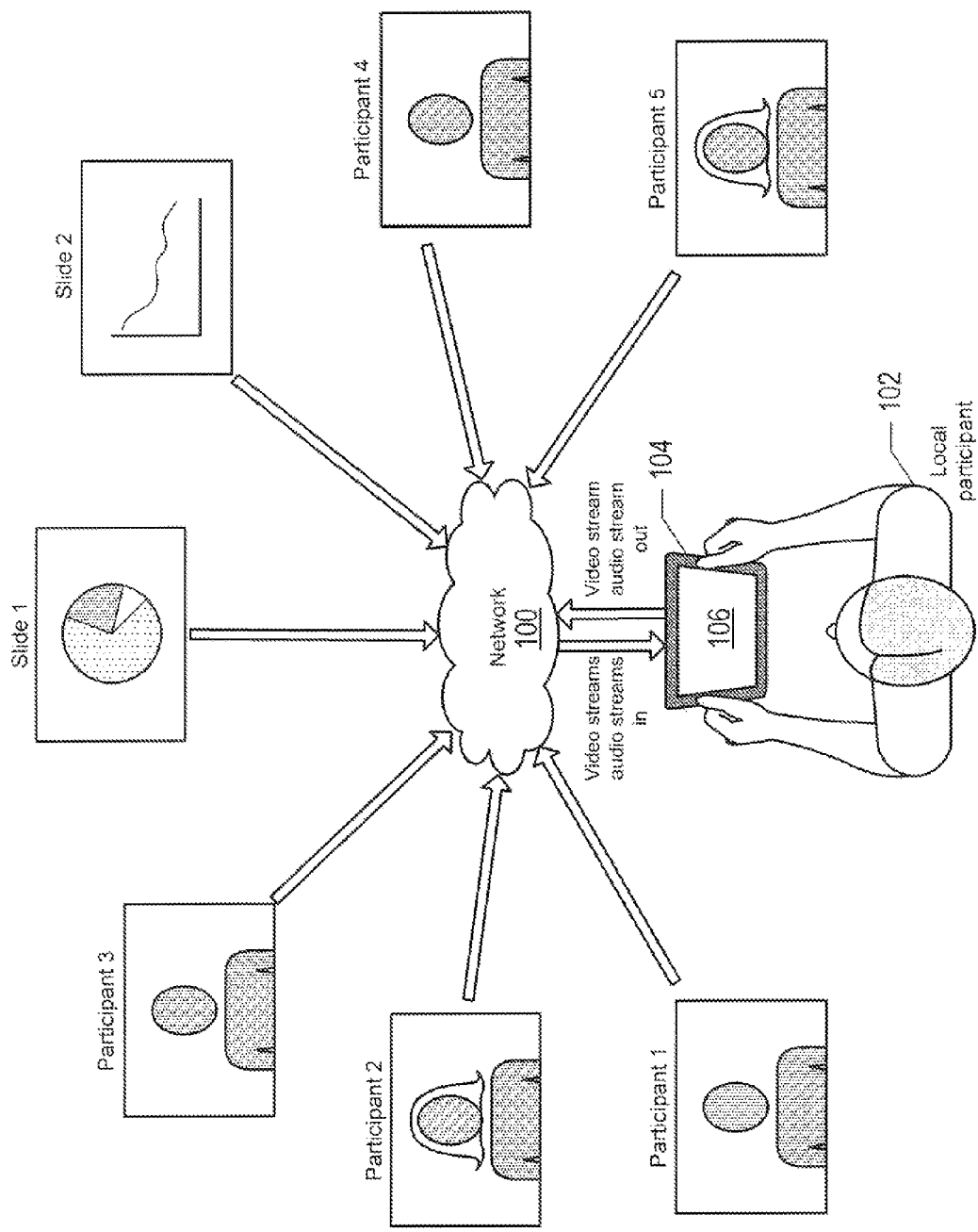
FIG. 1 shows a representation of video and audio data streams associated with an example video conference from the point of view of a local participant.

Methods and systems for using portable electronic devices ("PEDs") in video conferences are disclosed. FIG. 1 shows a representation of video and audio data streams associated with an example video conference from the point of view of a local participant 102. The video conference is conducted over a network 100 that can be a local area network, a wide area network, a metropolitan area network, a global area network, or the Internet. In the example of FIG. 1, the local participant 102 uses a PED 104 to participate in the video conference with five other remotely situated participants. The PED 104 can be a tablet computer or a smartphone that sends video and audio streams generated by the local participant during the video conference to the network 100. The video and audio streams generated by each of the remote participants are sent to the network 100 and received by the PED 104. The separate video streams are to be presented as separate viewing areas on a touchscreen/display 106 of the PED 104. The separate viewing areas are identified as participants 1-5. Shared video content identified as slides 1 and 2 can be provided by any one of the participants and can be displayed in separate viewing areas during the conference. The remote participant audio streams can be blended into a combined audio to be heard by the local participant 102 using headphones connected to the PED 104 or to be heard using the PED 104 loud speakers.

Methods described below include arranging the viewing areas into a virtual meeting space and maintaining the relative positions of the viewing areas during the video conference. The virtual meeting space is conceptually larger than the display 106. Methods described below allow the local participant 102 to use the display 106 as a movable "window" onto the larger virtual meeting space. In other words, the local participant 102 uses the PED 104 to participate in a video conference with the same set of expectations regarding position for the remote participants and the video content as if the local participant 102 were seated at a table with the five remote participants physically present. By using the display 106 as a window onto the virtual meeting space, the local participant is able to position at least one viewing area in the display 106 in order to judge the mood and facial expressions of at least one remote participant or observe details in the shared content.

Figure 2:
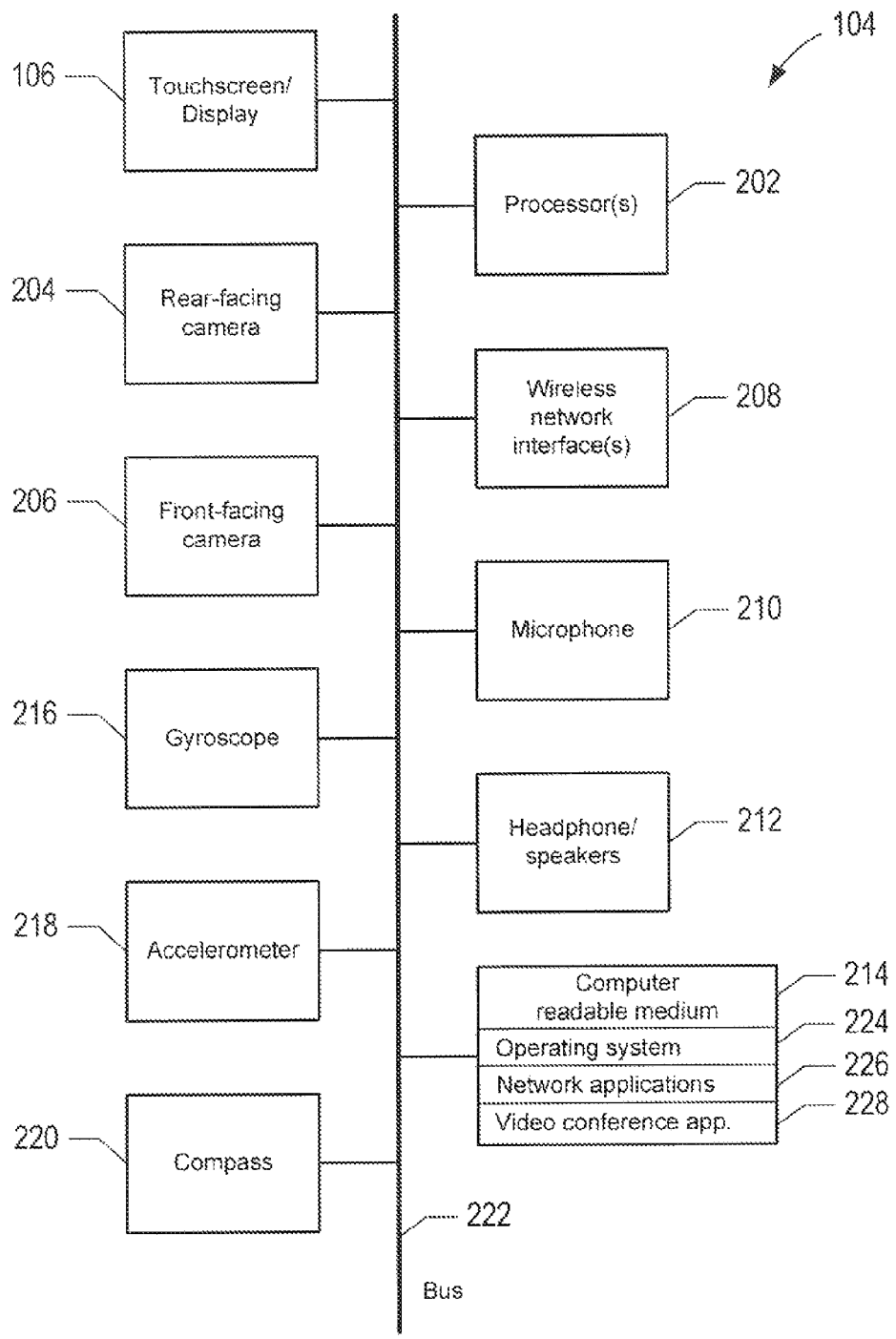
FIG. 2 shows an architecture of an example portable electronic device.

Methods described herein use various components and features of the PED 104 to present select portions of the virtual meeting space on the display 106. Consider first the architecture and components of the PED 104. FIG. 2 shows an architecture of the example PED 104. The PED 104 includes one or more processors 202; the touchscreen/display 106 shown in FIG. 1; a rear-facing camera 204 located opposite the display 106; front-facing camera 206 located on the same side of the PED 104 as the display 106; wireless network interfaces 208, such as a WiFi antenna, 3G/4G antennas, and a Bluetooth antenna; a microphone 210; headphone port and speakers 212; a computer-readable medium 214; a gyroscope 216 to measure orientation and rotation of the PED 104; an accelerometer 218 to measure acceleration of the PED 104 and provide position information; and a compass 220. The gyroscope 216 and accelerometer 218 in combination can sense motion on six axes: up and down, left and right, forward and backwards, and roll, pitch, and yaw rotations. The PED 104 may also include other sensors to determine changes in the orientation and position of the PED 104. Each of these components is operatively coupled to one or more buses 222.

The computer-readable medium 214 can be any suitable medium that provides instructions to the processors 202 for execution. For example, the computer-readable medium 214 can be non-volatile memory, such as flash memory, an optical or a magnetic disk; and includes volatile memory. The computer-readable medium 214 can store software applications, including word processors, browsers, email, Instant Messaging, media players, and telephone software. The computer-readable medium 214 may also store an operating system 224, such as iOS®, Microsoft Windows OS®, Linux®, Google Android, Symbian OS, and webOS; network applications 226; and a video conferencing application 228. The operating system 224 can be multi-user, multiprocessing, multitasking, multithreading, and real-time. The operating system 224 can also perform basic tasks such as recognizing input from the microphone 210, gyroscope 216, accelerometer 218, and compass 220, sending output to the display 106; keeping track of files and directories on the medium 214; controlling the cameras 204 and 206; and managing traffic on the one or more buses 222. The network applications 226 include various components for establishing and maintaining network connections, such as software for implementing communication protocols using the wireless network interfaces 208. The video conference application 228 provides various software components for sending and receiving video and audio signals with one or more remote participants and creating, navigating, and viewing portions of a virtual meeting space, as described below.

Figure 3:
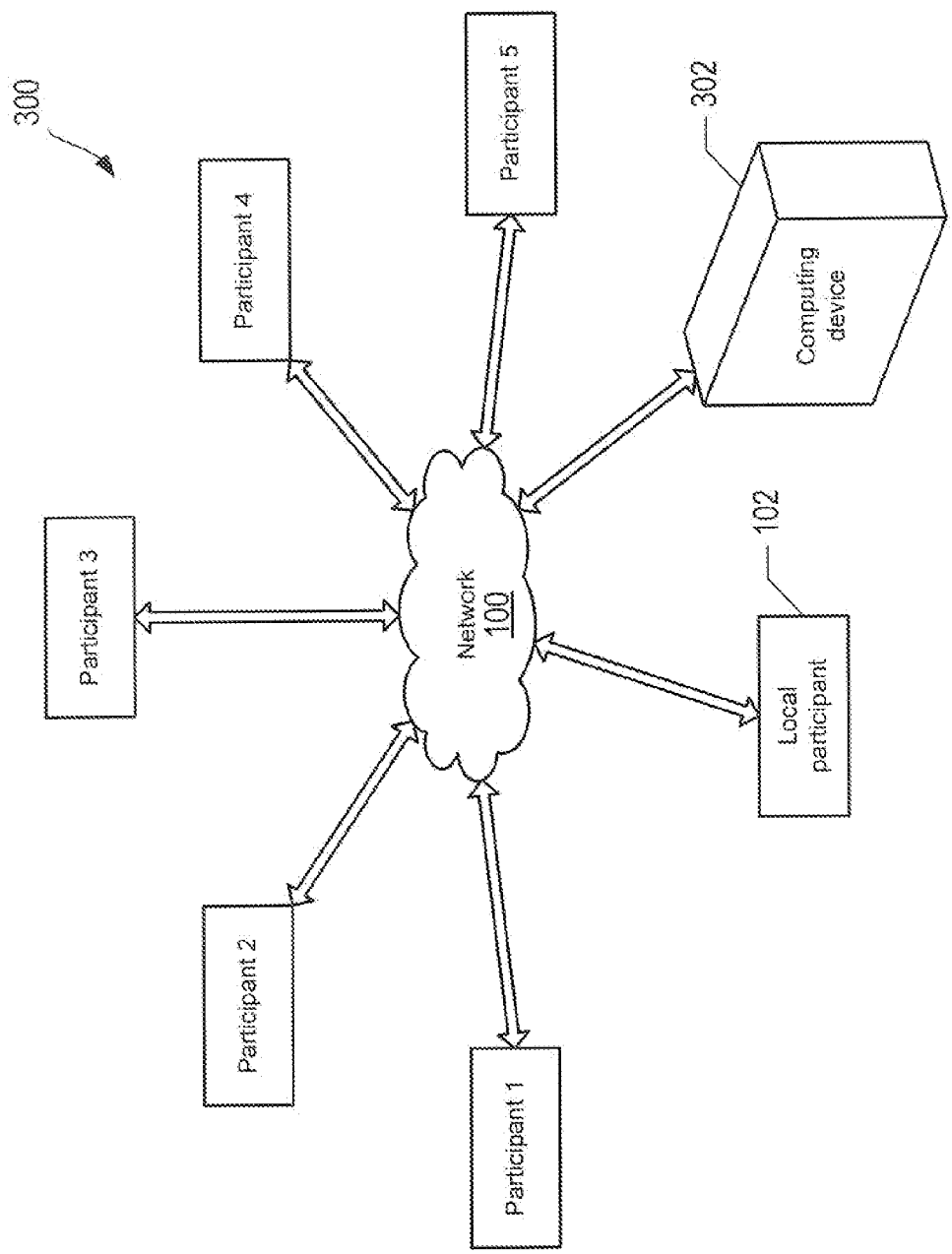
FIG. 3 shows a diagram of an example client-server network to conduct a video conference.

The video conference can be conducted using a client-server network. FIG. 3 shows a diagram of an example client-server network 300 to conduct a video conference between the six participants. Each remote participant has video conferencing equipment that includes a camera, a microphone, a display, and a computing device that runs a client-side video conferencing application that sends video and audio data streams generated by the participant to a centralized computing device 302 via the network 100. The computing device 302 can be operated by one of the remote participants or can be located at a separate location. The device 302 receives the video and audio streams from each of the participants and includes a server-side video conferencing application that processes each of the video and audio streams supplied by the participants. The server-side application sends to each participant the video and audio streams of the other participants and sends any shared content to the participants. For example, the server-side application sends the video and audio streams generated by the remote participants 1-5 to the local participant 102 and sends the video and audio streams generated by the local participant 102 to the participants 1-5. The client-side application run by each remote participant displays the video streams, or a subset of the video streams, and plays the combined audio of the other participants and may allow the participant to arrange the viewing areas of the other participants as desired. A video conference can be initiated by one of the participants logging into the server-side application via a client-side application. The server-side application then manages each participant that leaves or enters the video conference and can send an appropriate notice to the participants when a participant leaves or enters the video conference.

Figure 4:
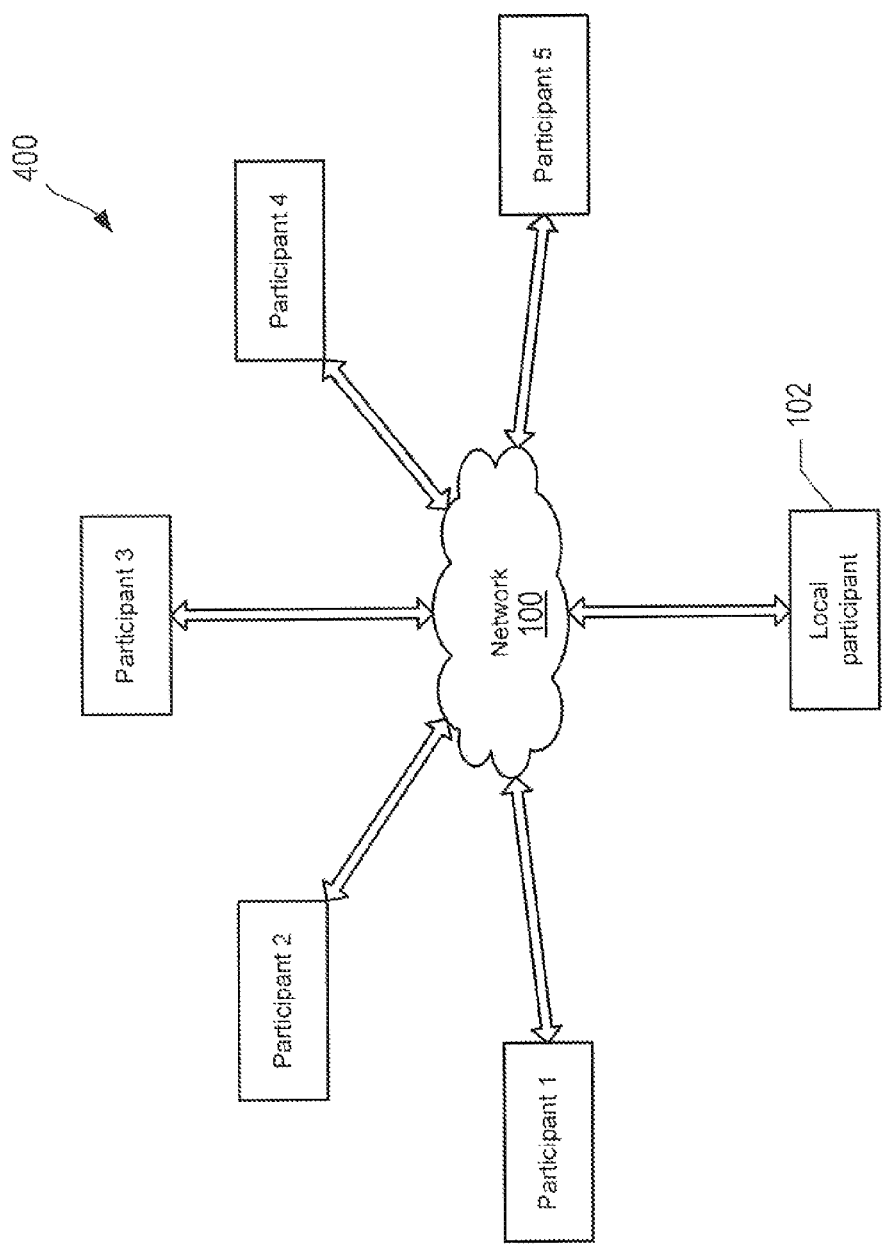
FIG. 4 shows a diagram of an example peer-to-peer network to conduct a video conference.

Alternatively, the video conference can be conducted using a peer-to-peer network. FIG. 4 shows a diagram of an example peer-to-peer network 400 to conduct a video conference between the six participants. Each participant runs the same copy of a peer-to-peer video conferencing application locally and the video conferencing tasks are distributed between the participants. Video and audio data streams are generated by each participant. The video conferencing application enables each participant to connect with another participant is computing device via the network 100 to access the video stream and audio stream generated by the other participant. For example, when a video conference is established between the six participants shown in FIG. 4, local participant 102 has access to each of the remote participants computing devices to download the video and audio streams generated by the remote participants. The video conference can be initialed by a first participant executing the peer-to-peer video conferencing application. After launching the application, the first participant identifies a second participant to conference with and the second participant is sent a notification prompting him/her to enter the video conference with the first participant. When the second participant accepts the conference with the first participant, the video conferencing applications exchange video and audio streams. A third participant can join the video conference where each participant receives video and audio streams from the other two participants and sends locally generated video and audio streams to the other two participants. Any shared content provided by a participant is sent to or accessed by the other participants.

After the video conference is initiated, the video stream of each participant is received by the PED 104 and arranged in a data structure describing the location of each video stream's associated viewing area in a virtual meeting space. The data structure enables each video stream to be presented in real time within the boundaries of the associated viewing area when at least a portion of the viewing area lies within the boundaries of the display 106. In other words, a viewing area is created for each participant's video stream and for each shared content video stream. The viewing areas are assembled into a virtual meeting space. When at least a portion of a viewing area lies within the display 106 boundaries, the video stream associated with the viewing area is presented on the display 106 in real time. In addition, the remote participants' audio streams can be blended into a combined audio to be played by the PED 104 using headphones connected to the PED 104 or the PED 104 loud speakers.

Figure 5:
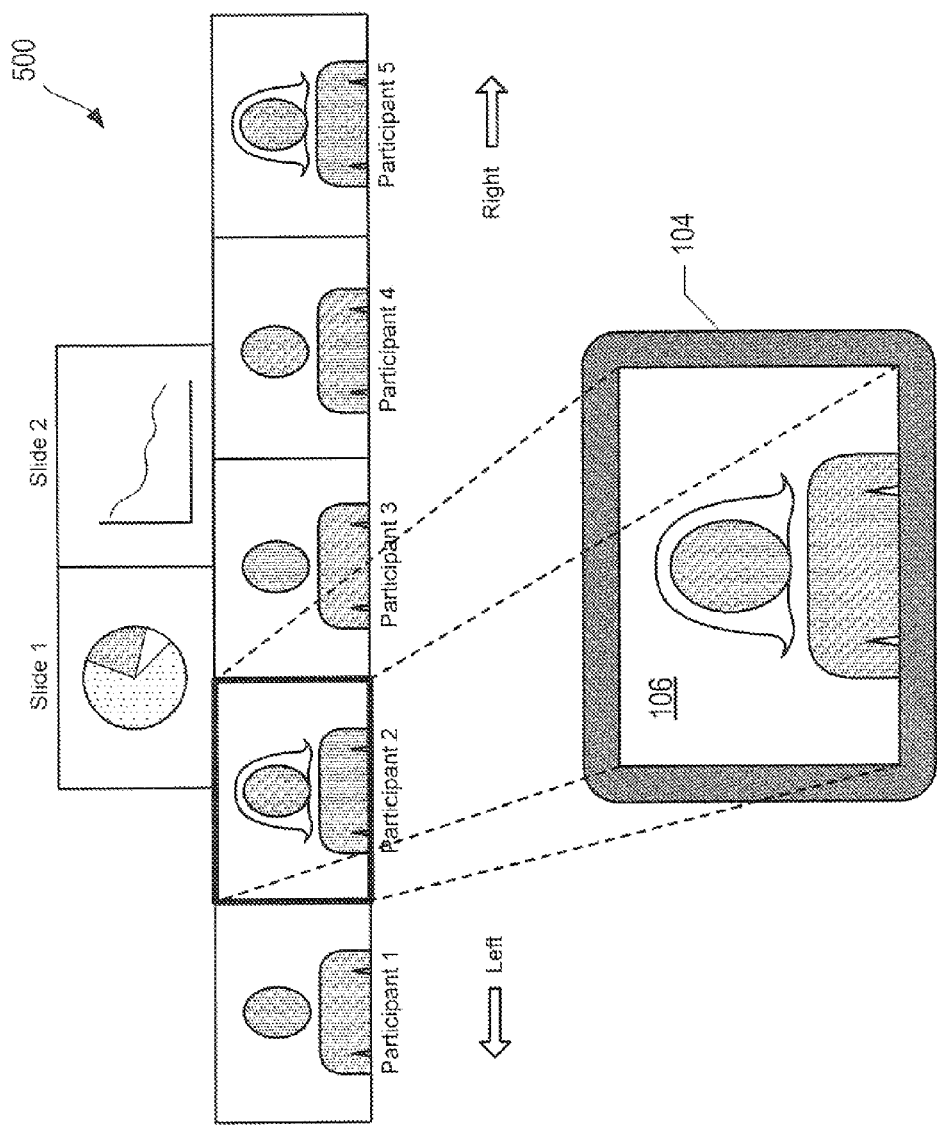
FIG. 5 shows an example arrangement of viewing areas of participants and shared content to form a virtual meeting space.

FIG. 5 shows an example arrangement of the viewing areas associated with the participants 1-5 and the slides 1-2 to form a virtual meeting space 500. In the example of FIG. 5, the virtual meeting space 500 is composed of viewing areas that display the participants from left to right from the point of view of the local participant and viewing areas that display slides 1 and 2 in a separate row located adjacent to and above the participant viewing areas. The virtual meeting space 500 conceptually represents a large viewing space in which the viewing areas associated with the remote participants and shared content are displayed. FIG. 5 reveals that the conceptual area of the virtual meeting space 500 can be much larger than the area of the display 106. Methods enable the display 106 of the PED 104 to be operated as a movable window into the virtual meeting space 500. For example, as shown in FIG. 5, the display 106 shows only the viewing area associated with participant 2. By displaying only the viewing area associated with participant 2, the local participant 102 is able to judge mood and facial expressions of participant 2 while participant 2 is speaking or while listening to other participants speak during the video conference.

Alternatively, rather than simply displaying the shared content slide in a separate row above or below the row of participants, the slide presented by a participant can be displayed either directed above or below the participant presenting the slide. For example, if participant 2 is presenting the information in slide 1, the viewing area for slide 1 can be located directly above or below participant 2 so that during the presentation the local participant can switch back and forth, as described below, between participant 2 and slide 1 while participant 2 is talking.

Figure 6B:
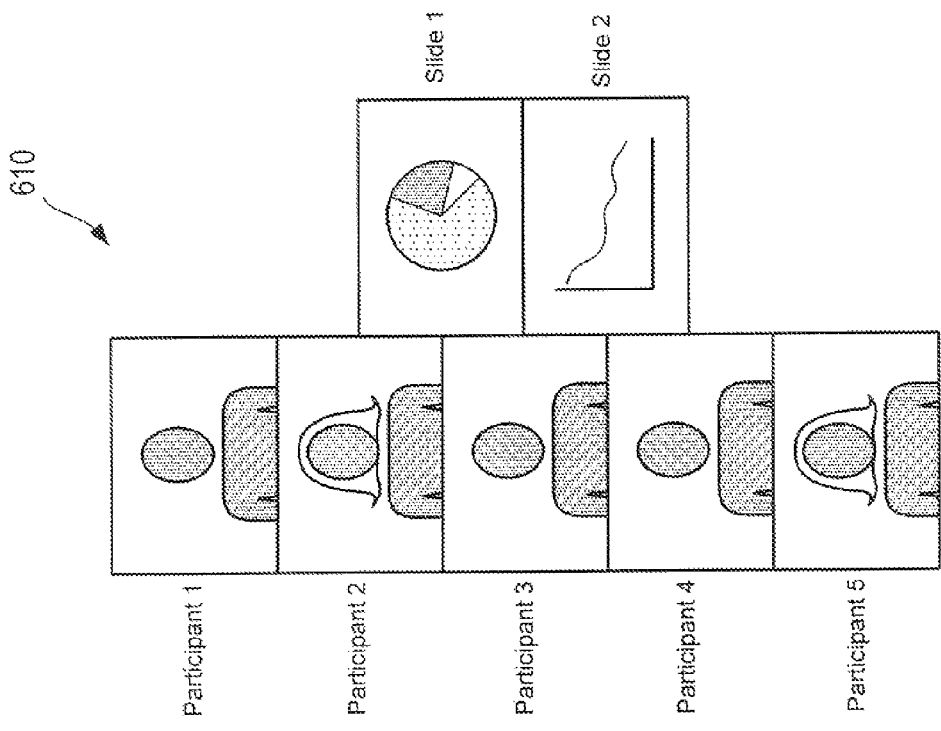
FIGS. 6A-6B show two examples of virtual meeting spaces.
Figure 6A:
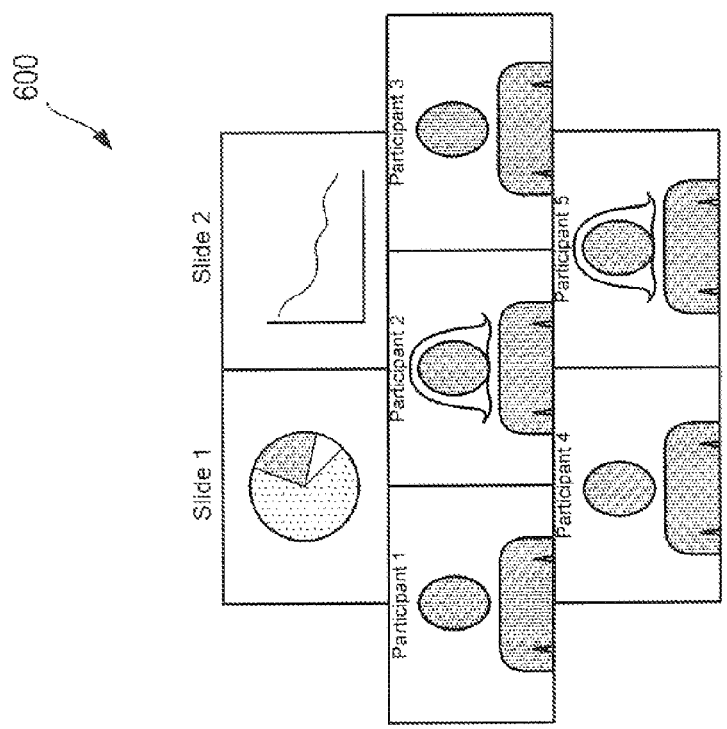

The arrangement of viewing areas comprising a virtual meeting space is not limited to the arrangement of the viewing areas in the virtual meeting space 500. The viewing areas can be arranged in any manner the local participant finds suitable for selectively positioning portions of the virtual meeting space 500 within the display 106. FIG. 6A shows an example virtual meeting space 600 in which the viewing areas associated with the participants 1-5 are arranged in two adjacent rows. FIG. 6B shows an example virtual meeting space 610 in which the viewing areas associated with the participants 1-5 and the slides 1-2 are arranged in two adjacent but separate columns.

The arrangement of viewing areas can represent the order in which the participants joined the video conference. For example, in FIG. 5, the viewing areas arranged from left to right can represent the order in which the participants entered the video conference where the left most viewing area displaying participant 1 indicates that participant 1 was the first participant to join and the right most viewing area displaying participant 5 indicates that participant 5 was the most recent participant to join the video conference.

Figure 7:
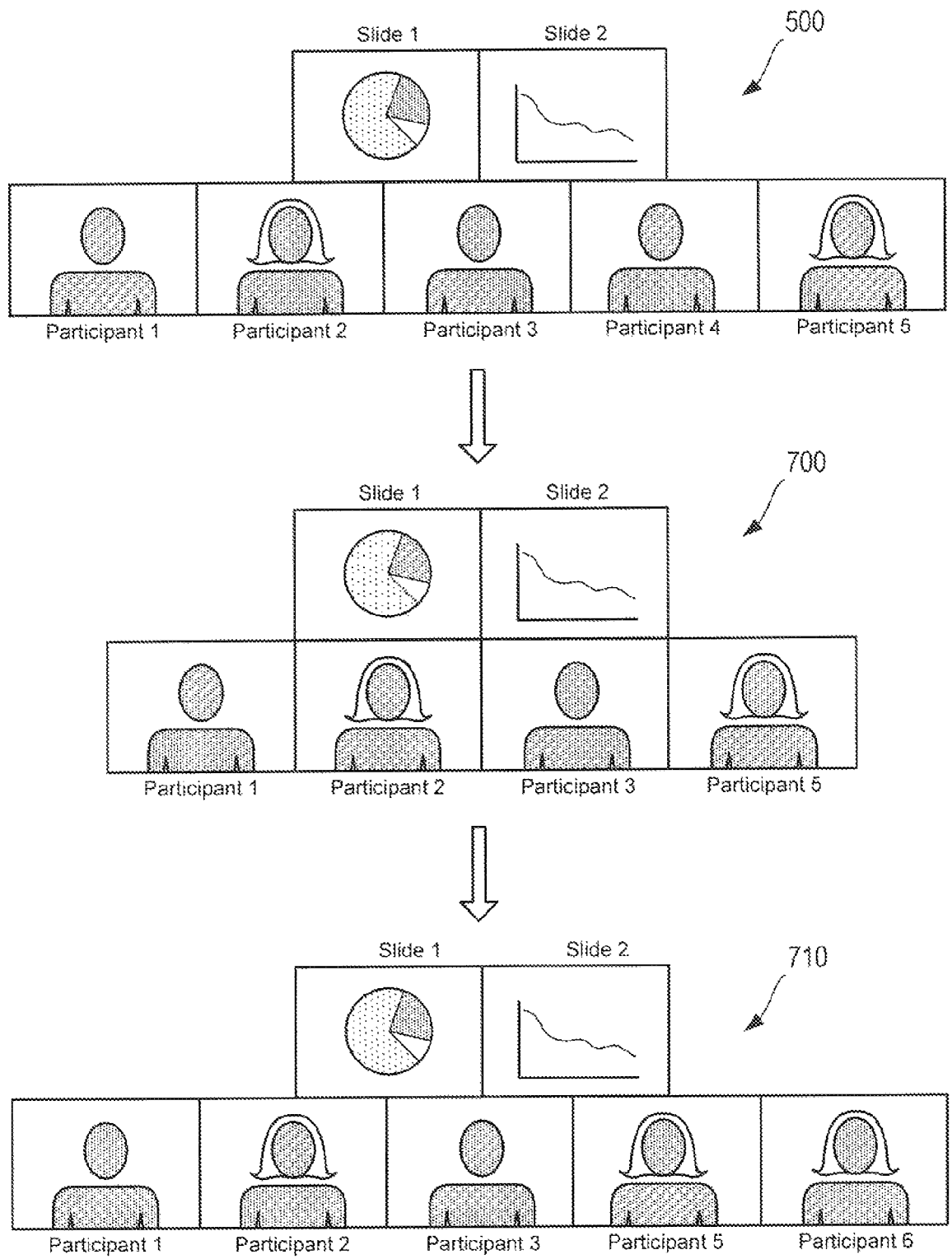
FIG. 7 shows an example of how a virtual meeting space changes as a result of a participant leaving and a participant joining an example video conference.

The number of participants taking part in the video conference can change over time. While the conference is taking place, some participants may leave and at other times other participant may join. On the one hand, when a participant leaves the video conference, the participant's video and audio streams are terminated and the viewing area used to display the leaving participant is deleted from the virtual meeting space. On the other hand, when a participant joins the video conference, the joining participant's audio stream is blended with the audio streams of the other remote participants and a new viewing area is created in the virtual meeting space to present the joining participant's video stream. FIG. 7 shows how the virtual meeting space changes as a participant leaves and a participant joins an example video conference. In the example of FIG. 7, initially, the video conference is between the participants represented by the virtual meeting space 500. After a period of time, suppose participant 4 leaves the video conference. In one embodiment, when participant 4 leaves, participant 4's video and audio streams are discontinued, the viewing area used to display participant 4 is deleted, and the row of viewing areas is shortened by positioning participant 3's viewing area adjacent to participant 5's viewing area. Alternatively, when participant 4 leaves, participant 4's video and audio streams are discontinued, but the viewing area used to display participant 4 is left empty or some other indicator can be used to indicate that participant 4 is no longer present. Suppose that at a later time, a participant 6 joins the video conference. When participant 6 joins, participant 6's video and audio streams are received, a viewing area used to display participant 6 is created and positioned adjacent to participant 5's viewing area to form a virtual meeting space 710.

FIGS. 8A-8D show examples of ways in which the PED 104 can be operated as a movable window into the virtual meeting space. FIGS. 8A-8D represent the local participants perception that the display 106 appears to operate like a window into the virtual meeting space 500, which can be accomplished by changing the PED 104 position or touching the display 106 to move the display 106 around the virtual meeting space 500 in two dimensions to place select portions of the virtual meeting space 500 in the display 106. In FIGS. 8A-8D, the portion of the virtual meeting space 500 that lies within a rectangle 800 is the image to be shown on the display 106, and directional arrows 801-804 represent just four examples of a large number of two-dimensional directions in which the display 106 appears to move in two-dimensions over the virtual meeting space 500.

Figure 8A:
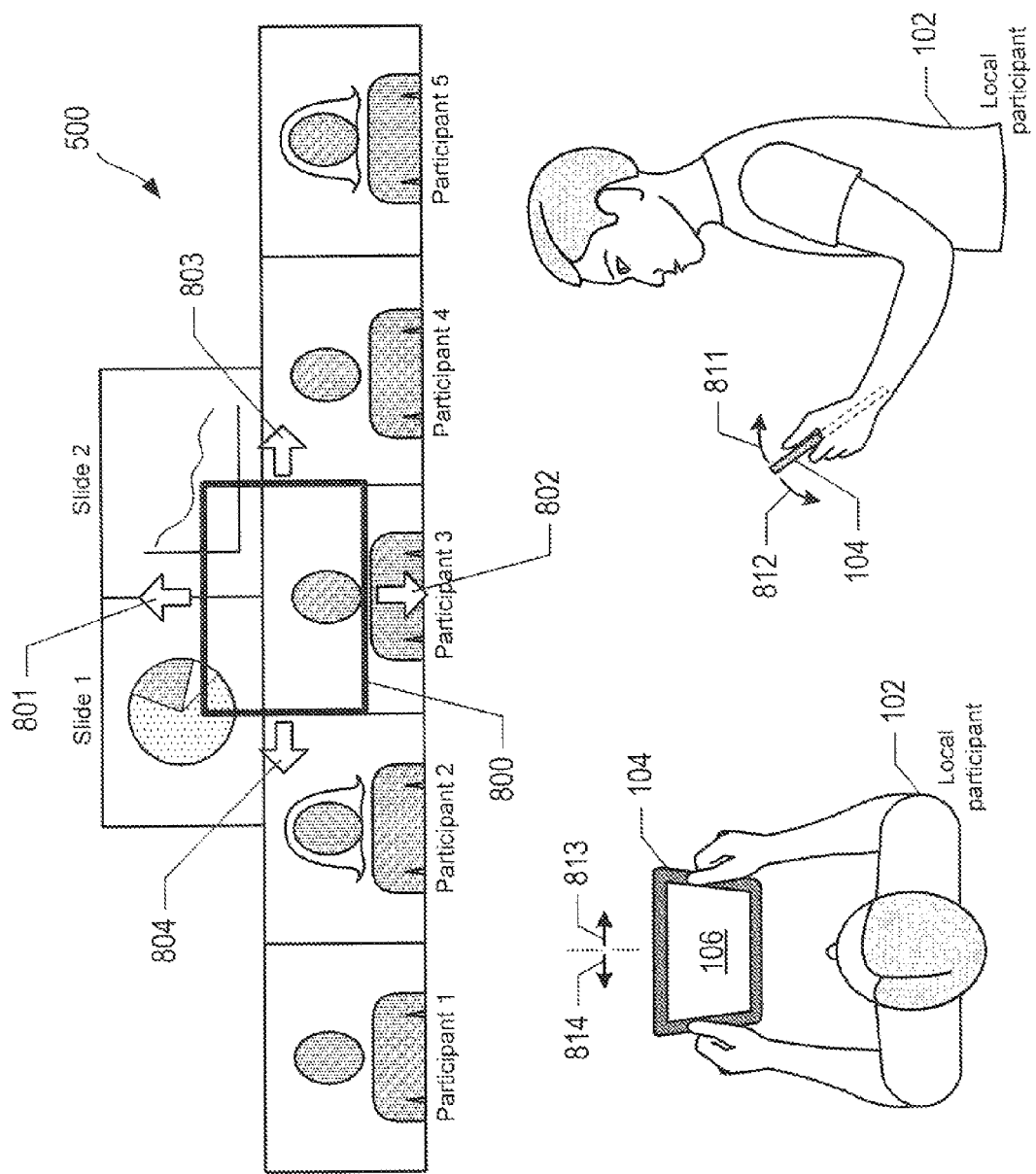
FIGS. 8A-8D show examples of ways in which a portable electronic device can be operated as a movable window into a virtual meeting space.

FIG. 8A represents the local participant 102 positioning select portions of the virtual meeting space 500 in the display 106 by tilting the PED 104. By tilting the PED 104, the accelerometer 218, gyroscope 216, and compass 220 can each be used separately or in combination to provide information about changes in the orientation of the PED 104. This information is used to create the perception to the local participant 102 that the display 106 is moving like a movable window over the virtual meeting space 500. For example, when the local participant 102 tilts the PED 104 forward 811, the display 106 appears to move in the direction 801 across the virtual meeting space 500; when the local participant 102 tilts the PED 104 backward 812, the display 106 appears to move in the direction 803 across the virtual meeting space 500; when the local participant 102 tilts the PED 104 to the right 813, the display 106 appears to move in the direction 803 across the virtual meeting space 500; and when the local participant 102 tilts the PED 104 to the left 814, the display 106 appears to move in the direction 804 across the virtual meeting space 500. The amount by which the PED 104 is tilted to position a portion of the virtual meeting space 500 in the display can be adjusted.

Figure 8B:
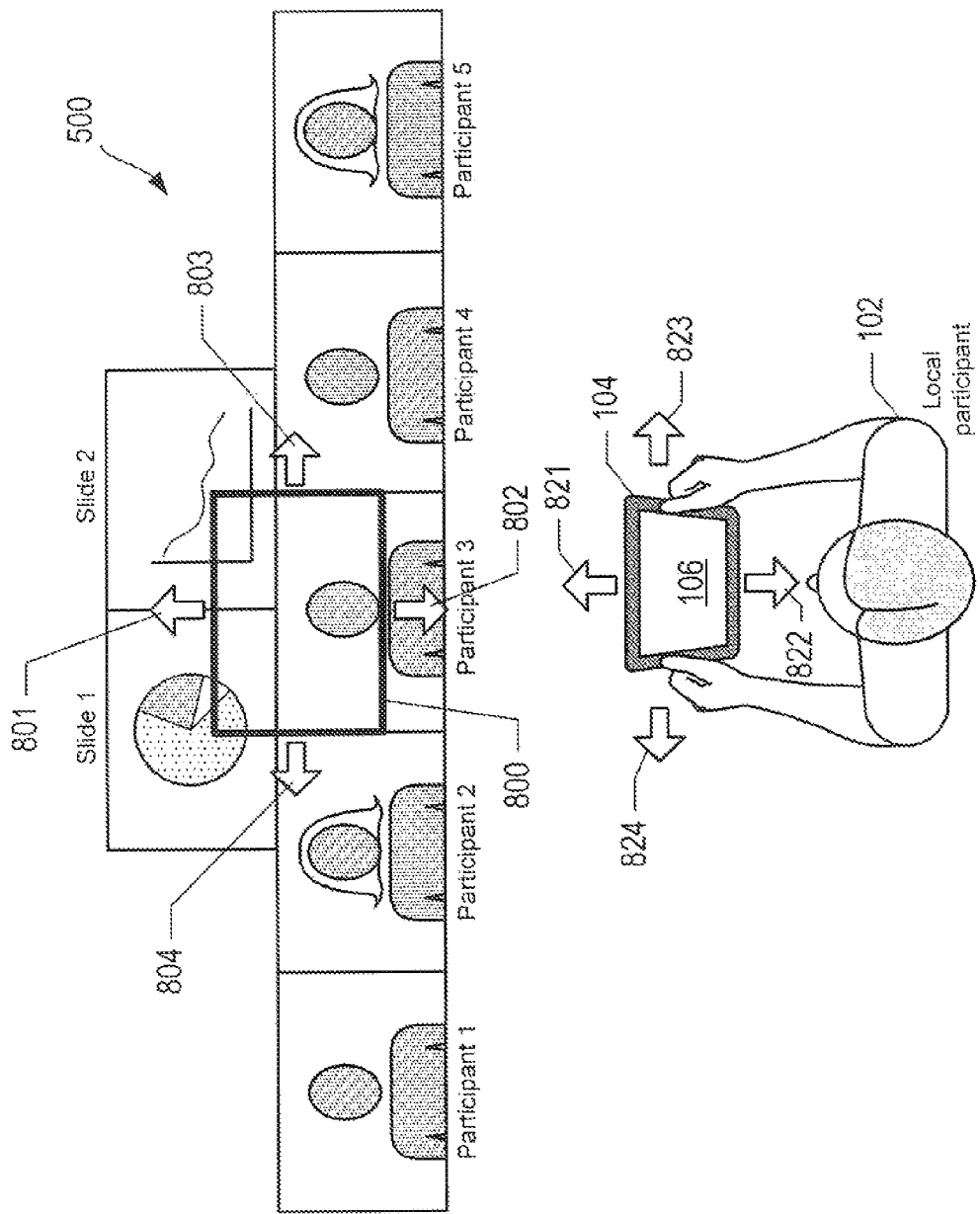

FIG. 8B represents the local participant 102 positioning images of select portions of the virtual meeting space 500 in the display 106 by panning the PED 104. By panning the PED 104, the accelerometer 218 and/or compass 220 provides information about changes in the position of the PED 104. This information is used to create the perception to the local participant 102 of moving the display 106 like a movable window over a stationary virtual meeting space 500. For example, when the local participant 102 moves the PED 104 upward 821, the display 106 appears to move in the direction 801 across the virtual meeting space 500; when the local participant 102 moves the PED 104 downward 822, the display 106 appears to move in the direction 802 across the virtual meeting space 500; when the local participant 102 moves the PED 104 to the right 823, the display 106 appears to move in the direction 803 across the virtual meeting space 500; and when the local participant 102 moves the PED 104 to the left 824, the display 106 appears to move in the direction 804 across the virtual meeting space 500. The amount by which the PED 104 is panned to position a portion of the virtual meeting space 500 in the display can be adjusted.

Alternatively, rather than using the acceleration information obtained from the accelerometer 218 and/or the orientation information obtained from the gyroscope 216, changes in a series of successive images captured by the rear-facing camera 204 can also be used to provide information about how the local participant positions the PED 104 to create the perception of the display 106 like a window over the virtual meeting space 500. For examples, returning to FIG. 8B, when the local participant 102 moves the PED 104 to the right 823, a series of successive images captured by the rear-facing camera 204 can be processed so that to the local participant 102, the display 106 appears to move in the direction 803 across the virtual meeting space 500.

Figure 8C:
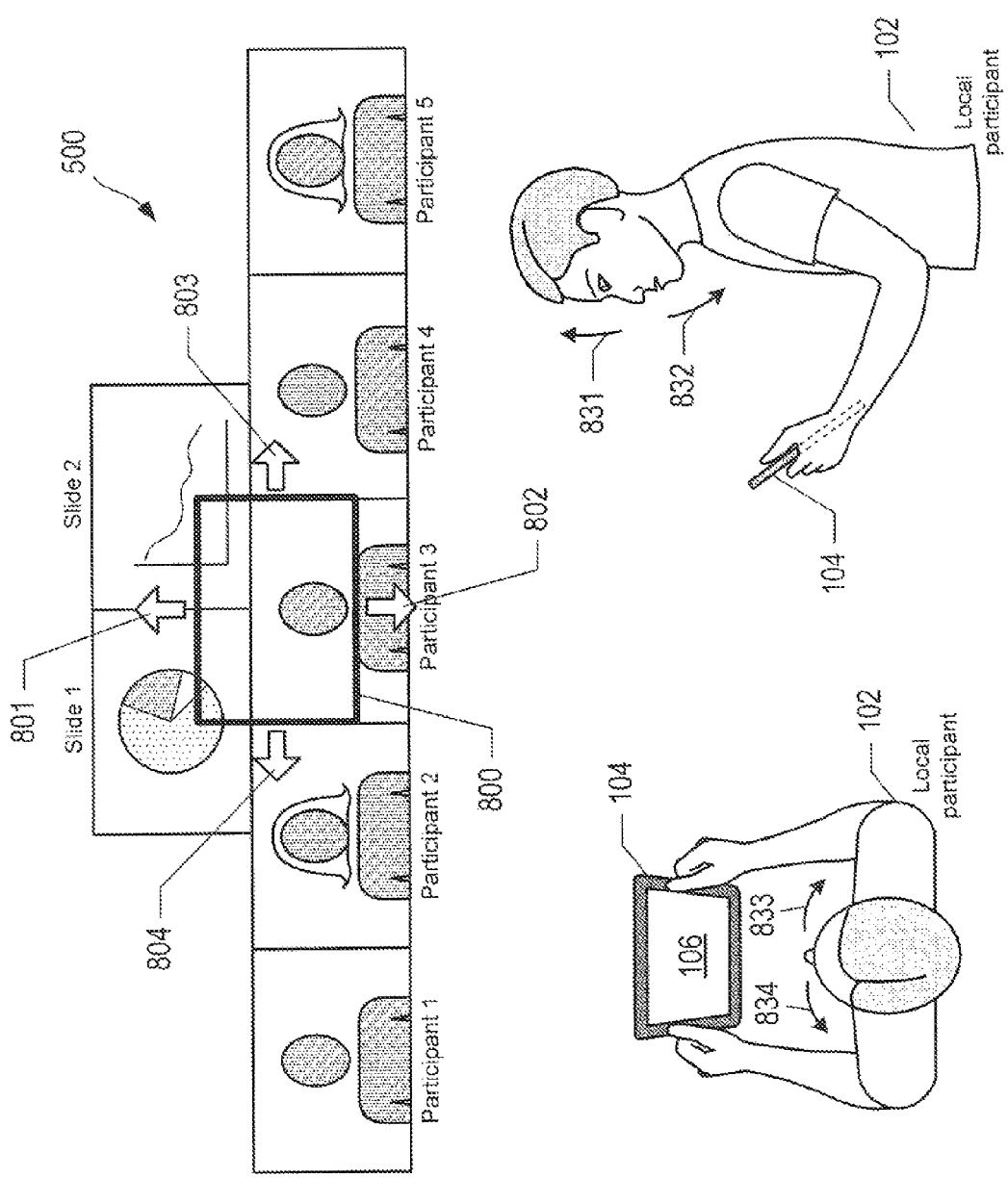

Changes in a series of images captured by the front-facing camera 206 of the local participant's 102 head orientation can also be used to provide information about how the local participant 102 desires to move the display 106 over the virtual meeting space 500. FIG. 8C represents the local participant 102 positioning images of select portions of the virtual meeting space 500 in the display 106 with changes in head orientation. For example, when the local participant 102 tilts his head upward 831, the display 106 appears to move in the direction 801 across the virtual meeting space 500; when the local participant 102 lilts his head downward 832, the display 106 appears to move in the direction 803 across the virtual meeting space 500; when the local participant 102 turns his head to right 833, the display 106 appears to move in the direction 803 across the virtual meeting space 500; and when the local participant 102 turns his head to the left 834, the display 106 appears to move in the direction 804 across the virtual meeting space 500. The amount by which the local participant 102 has to orient his head to position a portion of the virtual meeting space 500 in the display can be adjusted.

Alternatively the position of the local participant's head in images captured by the front-facing camera 206 could be used. For example, an image captured by the camera 206 with the local participant's face located in the upper left portion of the image indicates that the camera 206 is tilted down and to the right with respect to the local participant 102. This information can then be used to select the right-most participant 5.

Figure 8D:
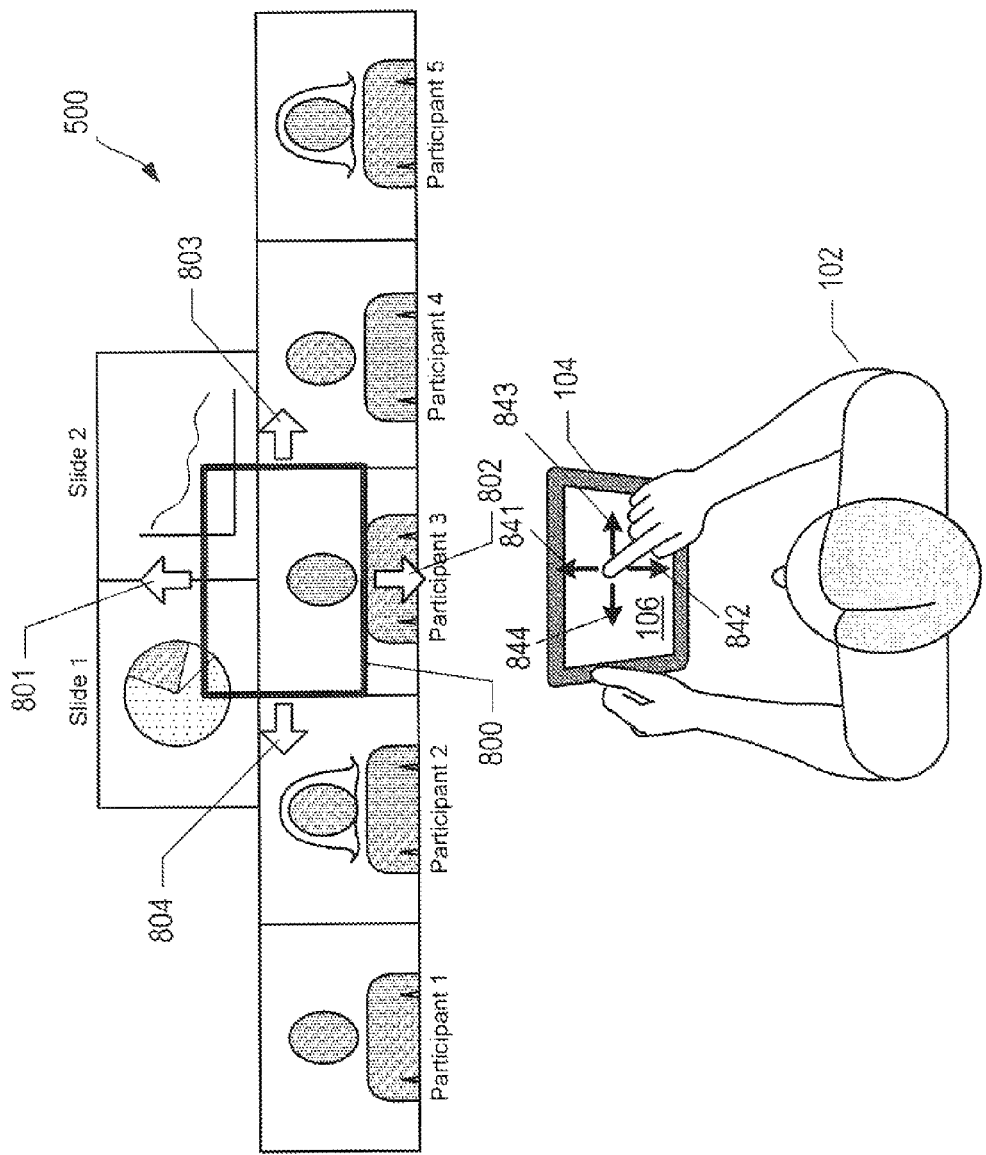

The touchscreen feature of the display 106 can also be used by the local participant 102 to move the display 106 over the virtual meeting space 500. FIG. 8D represents the local participant 102 positioning images of the virtual meeting space 500 in the display 106 using the touchscreen feature of the display 106. For example, when the local participant 102 drags his finger upward 841, the display 106 appears to move in the direction 802 across the virtual meeting space 500; when the local participant 102 drags his finger downward 842, the display 106 appears to move in the direction 801 across the virtual meeting space 500; when the local participant 102 drags his finger to the right 843, the display 106 appears to move in the direction 804 across the virtual meeting space 500; and when the local participant 102 drags his finger to the left 844, the display 106 appears to move in the direction 803 across the virtual meeting space 500. The amount by which the local participant 102 has to move his fingers across the surface of the display 106 to move the display 106 across the virtual meeting space 500 can be adjusted.

Methods also include enabling the local participant to control the magnification of the image in the display 106 using the touchscreen feature of the display 106. For example, when the local participant desires to increase the magnification of a viewing area, the participant can place his finger and thumb on the display and by dragging his thumb and finger apart the magnification is increased. Alternatively, when the local participant desires to decrease the magnification of the viewing area in order to display two or more participant viewing areas or the entire virtual meeting space within the display boundaries, the local participant drags his thumb and finger to together toward the center of the display 106. Alternatively, the local participant can also tap his finger on the display 106 to increase or decrease the magnification of a select portion of the virtual meeting space in the display 106.

Alternatively, methods also include enabling the local participant to control the magnification of the image on the display 106 using the front-facing camera 206. In this example, changes in the size of the local participant 102 over a series of images captured by the front-facing camera 206 can be used to control magnification of the images presented on the display 106. For example, when the local participant 102 moves the PED 104 closer to his face, the series of images captured by the camera 206 indicate the local participant 102 has moved closer to the display 106, which results in the image presented oh the display 106 being magnified.

Figure 9:
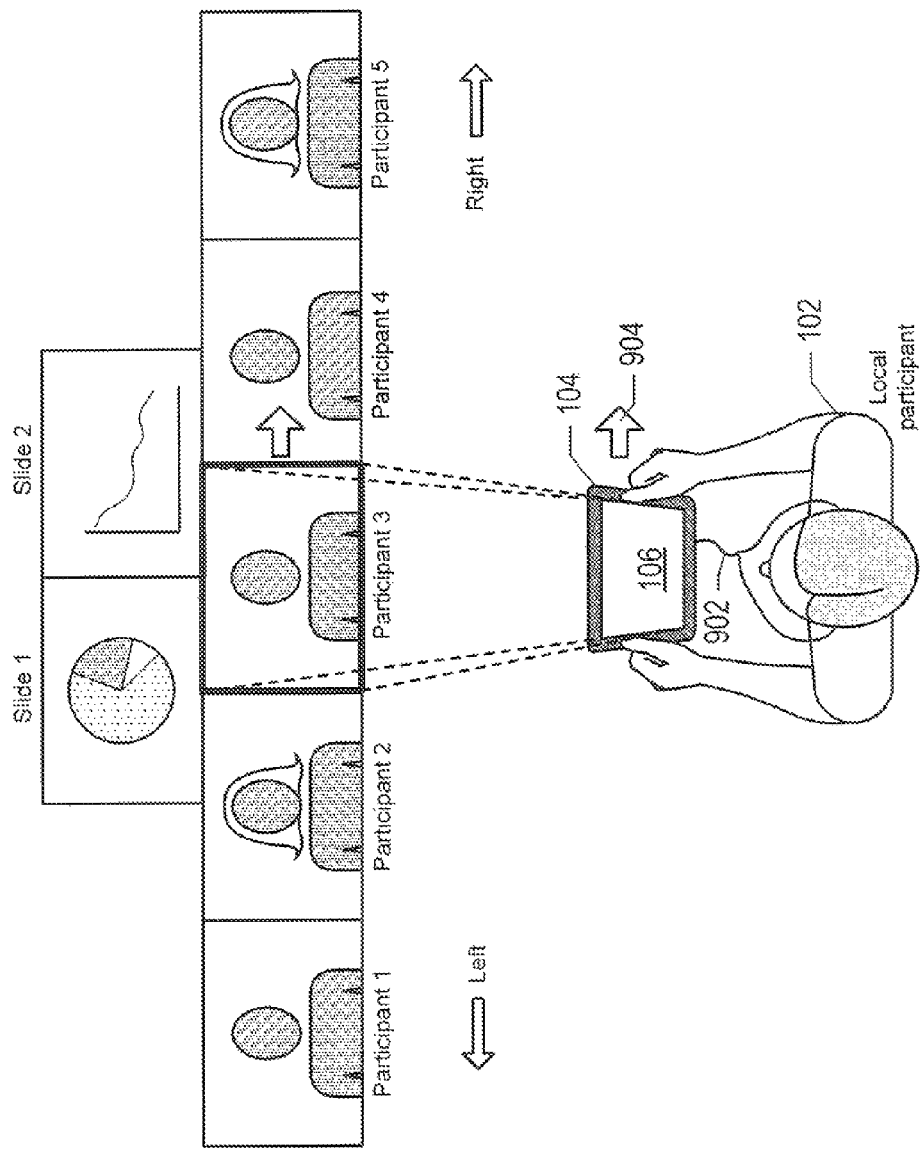
FIG. 9 shows an example of a local participant receiving directions over headphones to navigate a virtual meeting space.

With only a limited amount of space to display a large number of participants, the local participant may not have enough information about which way to move in the virtual meeting space to view a speaking participant. Methods include providing audio cues to direct the local participant to the viewing area associated with the speaking participant. For example, the local participant 102 can listen to the audio of the video conference through headphones 902 connected to the PED 104 as shown in FIG. 9. Initially, the local participant is viewing participant 3's viewing area and can listen to participant 3 speak in stereo. When participant 5 begins to speak, the audio from participant 5 is played in the right ear piece of the headphones 902. The local participant 102 can respond by panning, titling, or scrolling the PED 104 to the right 904 to place participant 5's viewing area in the display 106.

Figure 10A:
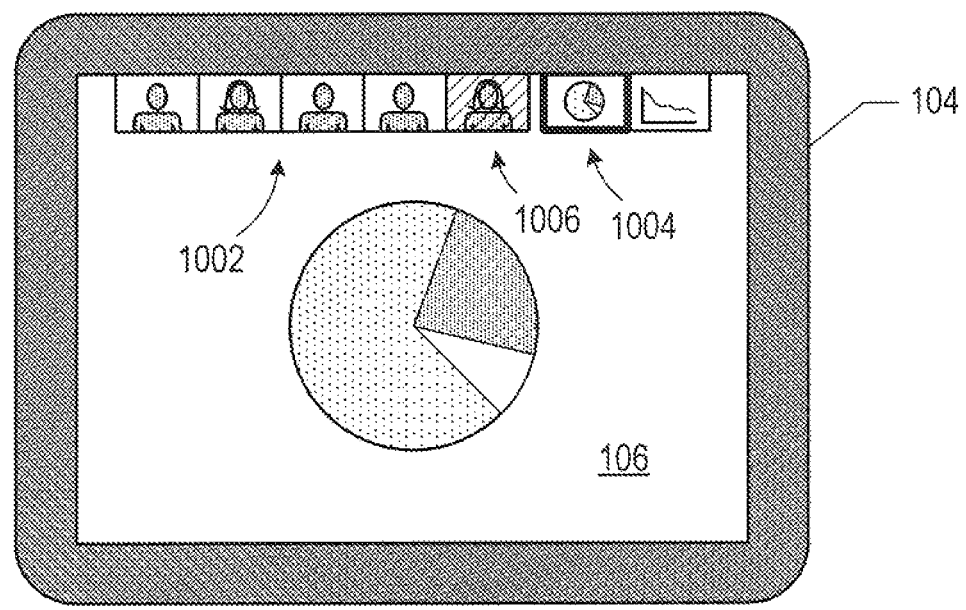
FIGS. 10A-10B show an example strip of reduced size viewing areas of remote participants and shared content located along the top edge of a portable electronic device display.
Figure 10B:
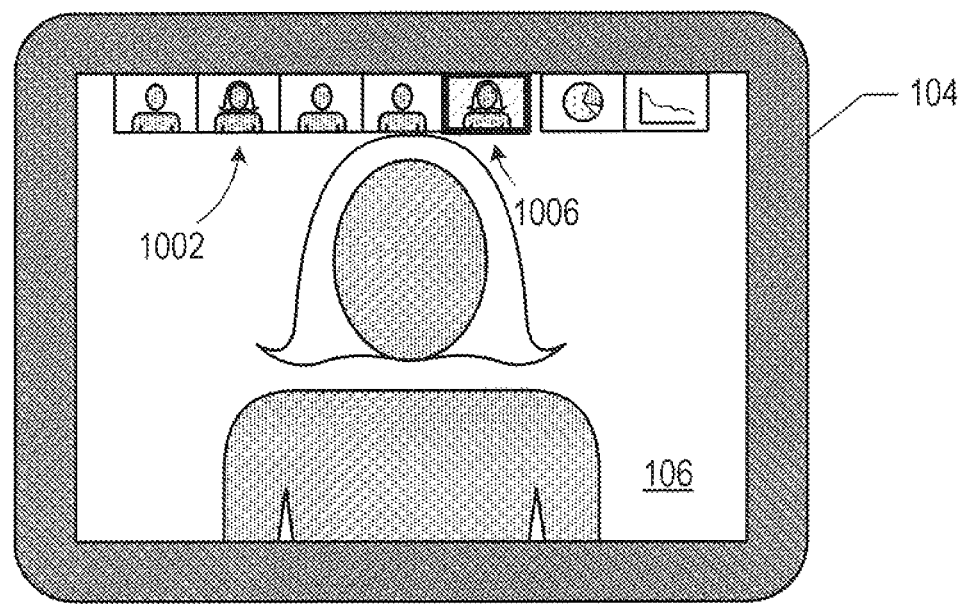

Alternatively, a strip of miniaturized remote participant viewing areas are located along an edge of the display with the speaking participant(s) highlighted can be included in the display 106 so the local participant knows which way to pan, title, or scroll the display 106 to see the speaking participant. FIG. 10A shows an example strip 1002 of reduced size images of the live remote participant viewing areas and two content viewing areas located along the top of the display. The participant viewing areas can be arranged in the same manner the participant viewing areas are arranged in the virtual meeting space 500. In the example of FIG. 10A, the border of the reduced viewing area 1004 of slide 1 is highlighted to indicate that slide 1 is the image shown on the display 106. The reduced viewing area 1006 of participant 5 is highlighted to indicate that participant 5 is the only participant speaking. The local participant can then move the display 106 to view participant 5, as shown in FIG. 10, using at least one of the methods described above with to FIGS. 8A-8D. Alternatively, the local participant can scroll with his finger along the strip 1002 to participant 5's viewing area to move participant 5's viewing area into the display 106, or the local participant can touch or tap on the highlighted image 1006 of participant 5 to bring up participant 5's viewing area in the display 106.

Figure 11:
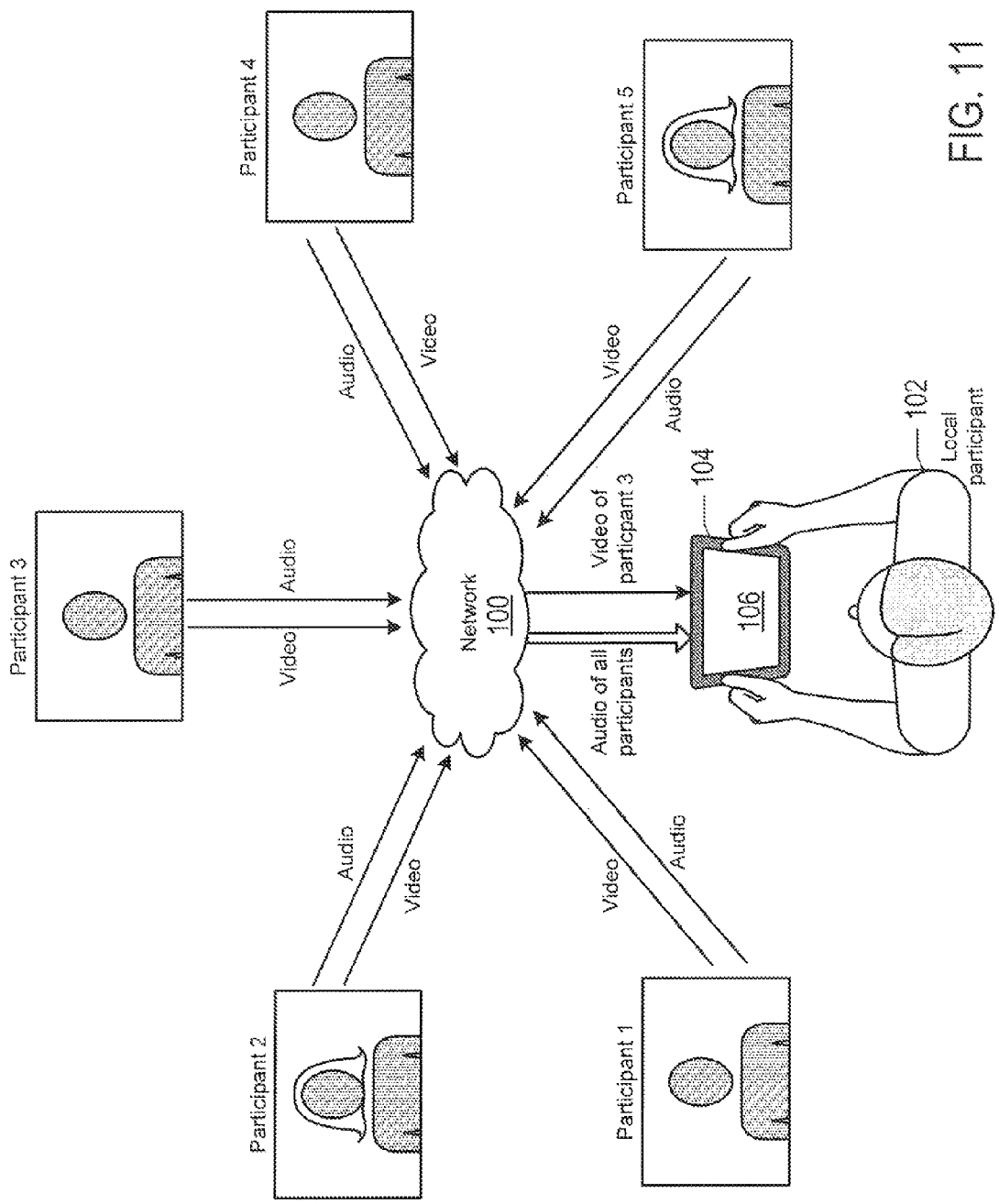
FIG. 11 shows a representation of video and audio streams generated by remote participants of an example video conference from the point of view of a local participant.

In an effort to reduce the size of the data streaming into the PED 104 from the network 100, methods include permitting the local participant 102 to control the manner in which video data streams are to be received and displayed. For example, the local participant 102 may choose to have only the video streams of visible remote participants to be sent to the PED 104. FIG. 11 shows a representation of video and audio streams generated by the remote participants of an example video conference from the point of view of the local participant 102. In the example of FIG. 11, each of the participants 1-5 generates a video and an audio stream that is sent to the network 100, except only the video stream of the participant (i.e. participant 3) is received, processed, and presented on the display 106. Methods include determining that participant 3 is the only video stream that to be streamed to the PED 104. Also, the video of non-speaking participants can be sent with a lower bit-rate/quality, based on the assumption that the participants are less likely to be looking at the non-speaking participants. Methods may also include enabling the local participant 102 the option of selecting which subset of video data streams to receive and/or display. For example, the local participant 102 can select to display the video streams of only participants in the general urea of the local participant's focus. The local participant 102 may select to have the video data streams of non-speaking participants in the virtual meeting space, to be decoded at a slower frame rate to save CPU cycles and battery power or use still images of the non-speaking participants that are periodically updated. In addition, the video streams in the strip of miniaturized images 1002 shown in FIG. 10 can be decoded at a slower frame or can be still images that are periodically updated.

CPU cycles, battery power, and transmission bandwidth can also be reduced by using a face tracker that crops each participant's image to exclude extraneous background from the video streams. As a result, a participant's face fills the viewing area. In addition, any of the methods described above that depend on the local participant's head position, such as using the local participants head position to move about the virtual meeting space described above with reference to FIG. 8C or to magnify the image presented on the display 106, reduces the number of CPU cycles and consumption of battery power.

Figure 12:
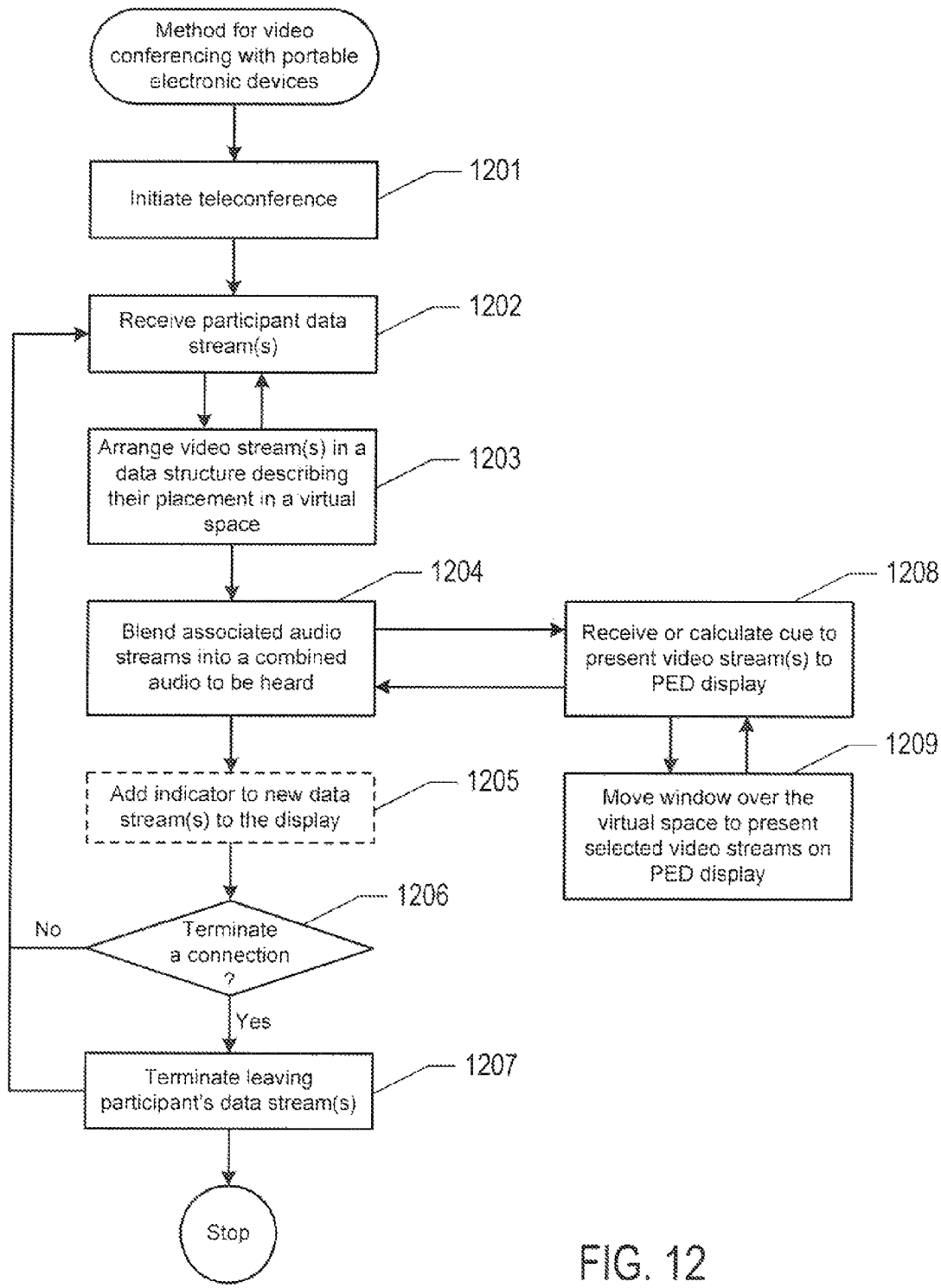
FIG. 12 shows a control-flow diagram of a method for video conferencing with a portable electronic device.

FIG. 12 shows a control-flow diagram 1200 of a method for video conferencing with a PED. The PED is operated by a local participant as described above. In block 1201, a teleconference between the local participant and at least one remote participant is initiated, as described above with reference to FIGS. 3 and 4. In block 1202, the PED receives remote participant video and audio data streams over a network, as described above with reference to FIG. 1. Alternatively, only the video streams of one or more speaking participants are received by the PED, or the video streams of non-speaking participants are received with a lower bit-rate and quality than the video of streams of the one or more speaking participants. In block 1203, the remote participant video stream(s) are arranged in a data structure that describes placement of the video streams in a virtual meeting space, as described above with reference to FIG. 5. In block 1204, the remote participant audio streams are blended into a combined audio stream to be heard by the local participant over a set of headphones connected to the PED or over the PED loud speakers. In block 1205, an indicator is presented on the PED display to indicate when a new participant is joining the video conference. In block 1206, when a remote participant terminates participation in the video conference, the method proceeds to block 1207. Otherwise, the method repeats the operations of blocks 1202-1205 to add remote participants. In block 1207, a leaving participant's video and audio data streams are terminated as described above with reference to FIG. 7 and the operations of blocks 1202-1205 repeated. In block 1208, cues to present video streams to present on the display 106 are received or calculated based on the local participant's interaction with the PED, as described above with reference to FIG. 8. In block 1209, the window into the virtual meeting is moved according to the cues to present selected video streams on the PED display, as described above with reference to FIG. 8. Note that methods are not intended to be limited to the order of operations presented in FIG. 12. The order of operations can be changed and the results obtained using the methods described above are unchanged.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration arid description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated.

It is intended that the scope of this disclosure be defined by the following claims and their equivalents:

1. A method for video conferencing between remote participants and a local participant using a portable electronic device, the method comprising:
   receiving each remote participant's audio data stream and remote participants' video data streams over a network;
   arranging the video data streams in a data structure that describes the locations of viewing areas for the video data streams within a virtual meeting space;
   blending audio streams into a combined audio of the remote participants;
   on the portable device display, presenting a view of a portion of the virtual meeting space; and
   responsive to directional cues provided by the local participant, changing the presented view to different portions of the virtual meeting space by panning in directions associates with the directional cues to different views over the arrangement of viewing areas within the virtual meeting space.

2. The method of claim 1, further comprising,
   adding an indicator to the display when a remote participant joins the video conference;
   adjusting the data structure to include the location of a viewing area to be added to the virtual meeting space, the viewing area to present the video stream of the remote participant that joins the video conference; and
   terminating the video and audio data streams of a remote participant that leaves the video conference.

3. The method of claim 1, wherein changing the at least one viewing area to be presented on the portable device display further comprises providing the local participant audio cues over the portable device speakers or headphones to indicate from which viewing area in the virtual meeting space a remote participant is speaking.

4. The method of claim 1, wherein presenting a strip of miniaturized remote participant viewing areas along an edge of the display with the visible remote participant and/or a speaking remote participant highlighted.

5. The method of claim 1, wherein receiving at least one remote participant's video data stream further comprises receiving only the video data streams of speaking remote participants.

6. The method of claim 1, wherein changing the at least one viewing area to be presented on the portable device display based on cues provided by the local participant further comprises using information obtained from the portable device gyroscope, accelerometer, and/or compass when the local participant tilts the portable device.

7. The method of claim 1, wherein changing the at least one viewing area to be presented on the portable device display based on cues provided by the local participant further comprises using information obtained from the display when the local participant drags a finger or thumb over the display.

8. The method of claim 1, wherein changing the at least one viewing area to be presented on the portable device display based on cues provided by the local participant further comprises using video information captured by a front-facing camera of changes in the local participant's head orientation.

9. The method of claim 1, wherein changing the at least one viewing area to be presented on the portable device display based on cues provided by the local participant further comprises using video information captured by a rear-facing camera as the portable device is moved by the local participant.

10. A method for video conferencing between remote participants and a local participant using a portable electronic device, the method comprising:
receiving each remote participant's audio data stream and at least one remote participant's video stream over a network;
arranging the at least one video streams in a data structure that describes the location of each video stream's associated viewing area within a virtual meeting space;
blending audio streams into a combined audio of the remote participants;
presenting at least one viewing area on the portable device display to be viewed by the local participant; and
changing the at least one viewing area to be presented on the portable device display based on cues provided by the local participant, wherein changing the at least one viewing area to be presented on the portable device display based on cues provided by the local participant further comprises using information obtained from the portable device accelerometer and/or compass when the local participant pans the portable device.

11. A non-transitory computing-readable medium having instructions encoded thereon for video conferencing between remote participants and a local participant using a portable electronic device, the instructions enabling at least one processor of the portable electronic device to perform the operations of:
receiving each remote participant's audio data stream and remote participants' video data streams over a network;
arranging the video data streams in a data structure that describes the locations of viewing areas for the video data streams within a virtual meeting space;
blending audio streams into a combined audio of the remote participants;
on the portable device display, presenting a view of a portion of the virtual meeting space; and
responsive to directional cues provided by the local participant, changing the presented view to different portions of the virtual meeting space by panning, in directions associated with the directional cues to different views over the arrangement viewing areas within the virtual meeting space.

12. The non-transitory computing-readable medium of claim 11, further comprising
adding an indicator to the display when a remote participant joins the video conference;
adjusting the data structure to include the location of a viewing area to be added to the virtual meeting space, the viewing area to present the video stream of the remote participant that joins the video conference; and
terminating the video and audio data streams of a remote participant that leaves the video conference.

13. The non-transitory computing-readable medium of claim 11, wherein changing the at least one viewing area to be presented on the portable device display further comprises providing the local participant audio cues over the portable device speakers or headphones to indicate from which viewing area in the virtual meeting space a remote participant is speaking.

14. The non-transitory computing-readable medium of claim 11, wherein presenting a strip of miniaturized remote participant viewing areas along an edge of the display with the visible remote participant and/or a speaking remote participant highlighted.

15. The non-transitory computing-readable medium of claim 11, wherein receiving at least one remote participant's video data stream further comprises receiving only the video data streams of speaking remote participants.

16. The non-transitory computing-readable medium of claim 11, wherein changing the at least one viewing area to be presented on the portable device display based on cues provided by the local participant further comprises using information obtained from the portable device accelerometer and/or compass when the local participant pans the portable device.

17. The non-transitory computing-readable medium of claim 11, wherein changing the at least one viewing area to be presented on the portable device display based on cues provided by the local participant further comprises using information obtained from the portable device gyroscope, accelerometer, and/or compass when the local participant tilts the portable device.

18. The non-transitory computing-readable medium of claim 11, wherein changing the at least one viewing area to be presented on the portable device display based on cues provided by the local participant further comprises using information obtained from the display when the local participant drags a finger or thumb over the display.

19. The non-transitory computing-readable medium of claim 11, wherein changing the at least one viewing area to be presented on the portable device display based on cues provided by the local participant further comprises using video information captured by a front-facing camera of changes in the local participant's head orientation.

20. The non-transitory computing-readable medium of claim 11, wherein changing the at least one viewing area to be presented on the portable device display based on cues provided by the local participant further comprises using video information captured by a rear-facing camera as the portable device is moved by the local participant.

* * * * *

UNITED STATES PATENT AND TRADEMARK OFFICE
CERTIFICATE OF CORRECTION

PATENT NO. : 8,581,958 B2
APPLICATION NO. : 13/089112
DATED : November 12, 2013
INVENTOR(S) : Mary G. Baker et al.

It is certified that error appears in the above-identified patent and that said Letters Patent is hereby corrected as shown below:

In the Claims:

In column 10, line 42, in Claim 1, delete "associates" and insert -- associated --, therefor.

In column 10, line 45, in Claim 2, delete "comprising," and insert -- comprising --, therefor.

In column 11, line 27, in Claim 10, delete "video" and insert -- video data --, therefor.

In column 11, line 61, in Claim 11, delete "panning," and insert -- panning --, therefor.

In column 12, line 2, in Claim 11, delete "arrangement" and insert -- arrangement of --, therefor.

Signed and Sealed this
Fourth Day of March, 2014

Michelle K. Lee
*Deputy Director of the United States Patent and Trademark Office*